US006540372B2

(12) United States Patent
Joseph (10) Patent No.: US 6,540,372 B2
(45) Date of Patent: Apr. 1, 2003

(54) ELECTRICAL TRACK LIGHTING SYSTEM (75) Inventor: Mark Joseph, Aspen, CO (US)

(73) Assignee: Lites Now, LLC, Aspen, CO (US)

( * ) Notice: Subject to any disclaimer, the term of this patent is extended or adjusted under 35 U.S.C. 154(b) by 0 days.

(21) Appl. No.: 09/920,569

(22) Filed: Jul. 31, 2001

(65) Prior Publication Data

US 2002/0080603 A1 Jun. 27, 2002

Related U.S. Application Data (60) Provisional application No. 60/222,278, filed on Jul. 31, 2001.

(51) Int. Cl.$^7$ .................................................. F21S 8/00
(52) U.S. Cl. ...................... 362/147; 362/226; 362/398; 362/404; 362/430; 248/609; 248/683; 439/110; 439/111; 439/122
(58) Field of Search .................. 362/147, 226, 362/398, 404, 430; 248/683, 609; 439/110, 111, 122

(56) References Cited

U.S. PATENT DOCUMENTS 4,506,317 A * 3/1985 Duddy ........................ 362/191
5,833,358 A * 11/1998 Patik ........................... 362/226

* cited by examiner

*Primary Examiner*—Sandra O'Shea
*Assistant Examiner*—Mark Tsidulko
(74) *Attorney, Agent, or Firm*—Webb & Lewis LLC; Glenn L. Webb (57) ABSTRACT

An electrical track lighting system. The track lighting system includes a flexible track that includes a foamed adhesive strip on the upper surface separating two conductor rails. The track is cut to length and secured to the desired surface by the adhesive strip. Light fixtures having spring clip members with electrical contact surfaces engage onto the upper surface conductor rails of the track. An elastomer body provides a resilient force to ensure the engagement of the spring clip members.

13 Claims, 6 Drawing Sheets

ELECTRICAL TRACK LIGHTING SYSTEM

RELATED APPLICATIONS

This application relates to provisional patent application 60/222,278 filed on Jul. 31, 2001.

FIELD OF THE INVENTION

This invention relates to the field of track lighting systems.

BACKGROUND OF THE INVENTION

Track lighting systems are well-known for use in interior decorating, display cases, and many other uses. Typical track lighting systems use a track having an interior channel with electrical conductors within the interior channel. Light fixtures usually include two tangs that are inserted into the track interior channel and twisted until contact is made with the electrical conductors. The tracks are normally mounted to a wall or ceiling by mounting screws or hung by a pendant.

These systems are relatively difficult to install. It is necessary to cut the tracks to length and install with mounting hardware in the appropriate location. Often, it is difficult to mount the appropriate track in the desired location. Also, the tracks then become permanent attachments to the wall or ceiling. The fixtures require two hands to install and pivot in the track channel. Most fixtures can not be slid along the track channel to adjust the location of the fixture. Also, the connection may not be correctly made, thus causing arcing of the electrical contacts or even dislodgement of the fixture from the track. The track light systems are relatively expensive once all of the components are purchased and installed.

Another problem with existing track lighting systems is the rigid tracks used in most systems. It is not possible to "bend" the tracks of such systems around corners, or create angles without using special brackets and fixtures.

Existing track lighting systems tend to extend downward from ceilings or outward from walls. These systems are not suitable for low ceilings, small rooms or other environments where they are obtrusive.

There have been a number of attempts previously to solve these problems. However, these attempts have been largely unsuccessful. Thus, a need exists for an electrical track lighting system that is easily installed with little or no tools, relatively inexpensive, flexible, low-profile and having secure light fixtures.

SUMMARY OF THE INVENTION

The present invention solves these problems and others by providing a flexible track lighting system. The track lighting system of one preferred embodiment is quickly and easily installed with little or no tools or mechanical aptitude. The track lighting system can be used in almost any location and environment and can be decorated to fit unobtrusively in most decors.

In a preferred embodiment, the track lighting system includes fixtures that are quickly and securely installed on the track. The fixtures can be quickly adjusted to a desired location. In this embodiment, the fixtures can be simply snapped into place with one hand.

In a preferred embodiment, the track lighting system uses low-voltage DC current for safe and efficient use. The transformer and dimmer are low profile and can be mounted virtually anywhere.

The track lighting system of one preferred embodiment uses a double-sided adhesive tape for use with a flexible, PVC track. The track can be bent as necessary as well as painted if desired. The track already has adhesive mounted to the surface contact side protected by a release liner. In one embodiment, the track is supplied in rolls and strips are cut to desired lengths. The track thus tends to be low profile against a ceiling or wall.

The fixtures, in one preferred embodiment, include spring clip members. These spring clip members securely attach the fixture to the track by engaging the upper side of the track. Contact surfaces on the spring clip members engage conductors on the upper surface of the track to provide current to the light fixture.

In a preferred embodiment, an elastomer is biased against the track by the engagement of the spring clip members with the contact surfaces. This minimizes the accidental dislodgement of the fixture and ensures contact between the spring clip members and the conductors on the track.

In another embodiment of the present invention, magnetically oriented members on the track and fixtures ensure alignment of the fixture, polarity of the current and engagement between the fixture and track.

These and other features will be evident from the drawings and the detailed description of preferred embodiments.

DESCRIPTION OF PREFERRED EMBODIMENTS

The present invention provides an electrical track lighting system. It is to be expressly understood that the descriptive embodiments set forth herein are intended for explanatory purposes and is not intended to unduly limit the scope of the claimed inventions. Other embodiments and applications not described herein are considered to be within the scope of the invention. It is also to be expressly understood that while specific embodiments for the components of the electrical track lighting systems are discussed, other equivalents to these embodiments that perform substantially similar functions are within the scope of the claimed inventions.

Figure 1:
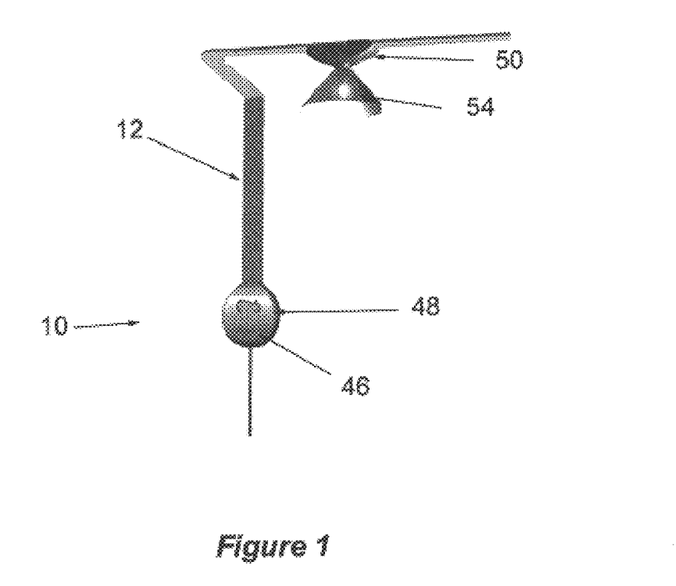
FIG. 1 shows a preferred embodiment of the electrical track system of the present invention.
Figure 2:
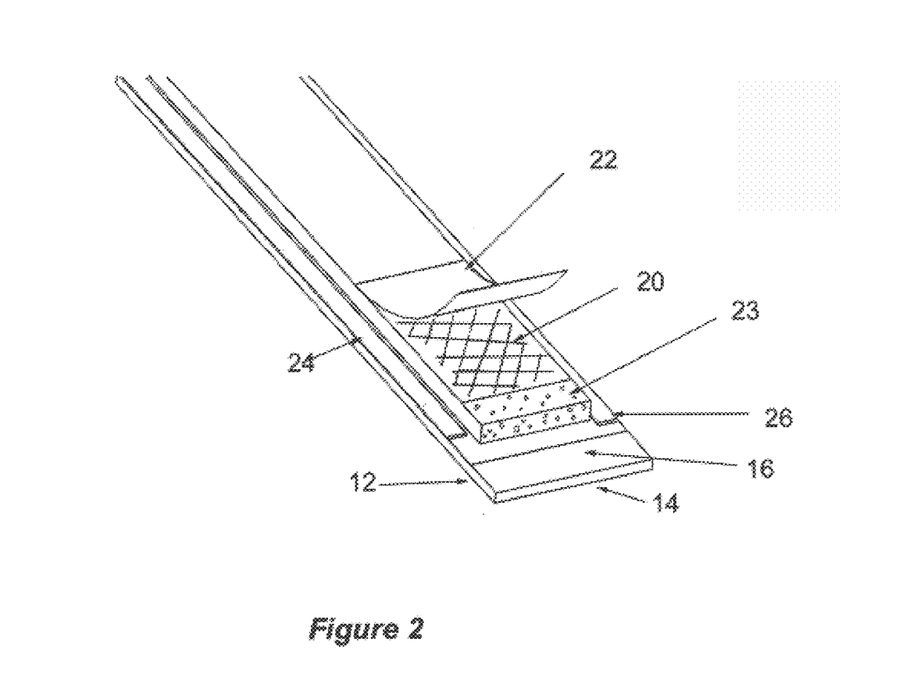
FIG. 2 shows a perspective view of the backing track of the embodiment of FIG. 1.
Figure 3:
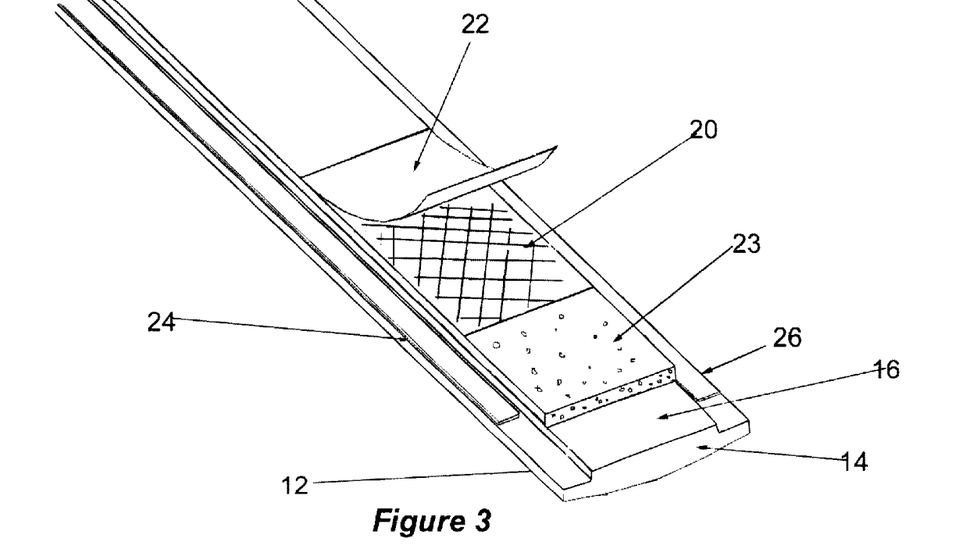
FIG. 3 shows a cross-sectional view of another backing track of a preferred embodiment of the present invention.
Figure 4:
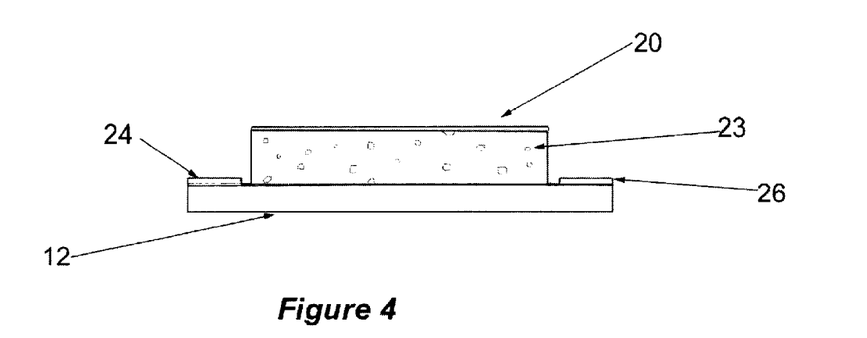
FIG. 4 shows a cross-sectional view of another backing track of a preferred embodiment of the present invention.
Figure 5:
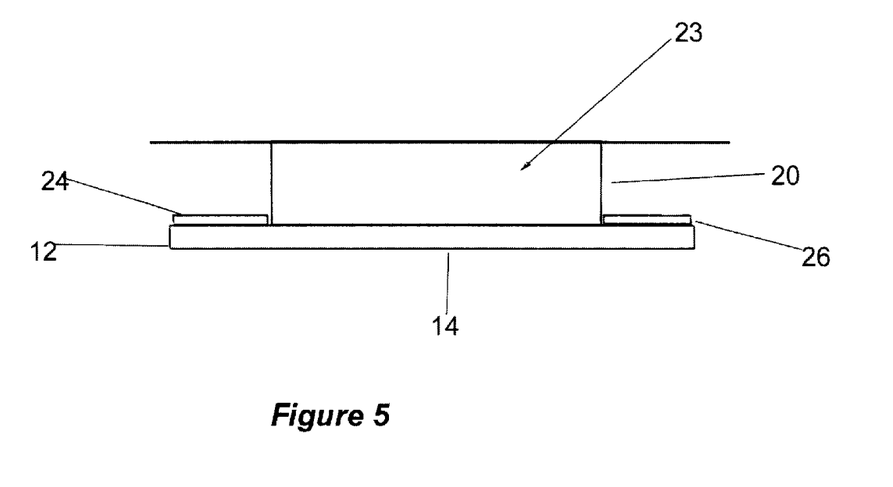
FIG. 5 shows a cross-sectional view of another backing track of a preferred embodiment of the present invention.

A preferred embodiment of the present invention is illustrated in FIGS. 1–5. The electrical track lighting strip 10 includes a flexible backing track 12. This flexible backing track 12 is formed of a magnetic material, an extruded plastic or other lightweight flexible strip material. In the preferred embodiment of FIGS. 1–15, the flexible backing track 12 is formed of rigid polyvinyl chloride (PVC) strip. The track can be extruded into a "T" shape, as shown in FIG. 3 or in a flat surface as shown in FIGS. 2 and 4. This provides a flexible, yet structurally stiff, lightweight strip material. It has a thickness of 0.25 inches or less in the preferred embodiment. It is to be expressly understood that other materials and thickness can be used as well. The bottom side 14 of backing track 12 is a substantially flat planar surface. As discussed in further detail below, the bottom surface 14 can have decorative tape mounted to it, or even painted as desired.

An adhesive strip 20, as shown in FIGS. 1–5, is affixed onto the track 12 on the upper side 16 of the track 12. This adhesive strip 20 is preferably attached to a foam material 23 having a thickness of about 0.1 inches, although other dimensions can be utilized as well with an adhesive layer. The adhesive strip 20 can also be integrally formed as part of the track 12. Adhesive strip 20, in this particular embodiment, is formulated of a particularly aggressive adhesive that can support the track 12 on any surface. In other preferred embodiments, the adhesive may be of a less aggressive nature in order to allow easy removal for temporary use. Prior to installation, adhesive strip includes a protective layer 22, such as a silicon-coated paper that prevents the adhesive from adhering to unintended surfaces. In the preferred embodiment, adhesive strip 20 is integrated directly into the track 12, while in other preferred embodiments the adhesive strip 20 is mounted onto the upper side 16 of backing track 12. In another embodiment, the adhesive strip includes a double-sided adhesive coating covered by a protective layer. The backing track 12 is cut to the appropriate length for use, then the adhesive strip is applied to the backing track and to the ceiling or wall location.

Electrical contact rails 24, 26 are mounted or formed on the upper side 16 of backing track 12. In the embodiment shown in FIG. 2, the contact rails are mounted to the backing track 12 by a thin adhesive layer. The contact rails 24, 26 are formed of conductive materials, such as copper, brass, aluminum or other known conductive materials. The contact rails 24, 26 are parallel and spaced from one another as well. The rails are electrically insulated from one another through the insulation properties of the backing track 12. The contact rails 24, 26, in the preferred embodiment, are flat copper foil tape, but could also be round, square or other shapes and sizes of exposed electrical wire as well. The contact rails extend the full length of the backing track 12.

In another preferred embodiment, the backing track 12 includes multiple sets of contact rails. These rails are spaced from one another and enable multiple groups of light fixtures to be installed on the backing track. Different switches control the electrical current to these different sets of rails. This enables a user to turn on and off and even dim different lights on the same track.

In the preferred embodiment, the adhesive strip 20 performs several important functions. One of these functions includes the mounting of the backing track 12, as discussed above. Another important function, in one preferred embodiment is the insulation between the contact rails 24, 26 and, as discussed above, different sets of contract rails. The foamed adhesive strip insulates between these conduct rails. Another function provided by a preferred embodiment of the adhesive strip is to provide spacing and thickness for the track lighting system, as shown in FIGS. 2–4. The foamed adhesive strip can be provided in the desired thickness and height, particularly for providing spacing from the surface onto which the system is being mounted. The system may even include additional adhesive strips that may be mounted onto adhesive strip 20 to provide additional spacing for the system.

The adhesive strip 20 along with the flexible track 12 enables the lighting system to be easily installed onto almost any surface, contour, ridge, corner, wall, etc. The combination of the track, foam, and adhesive strip is flexible and can be easily bent as needed.

Figure 6:
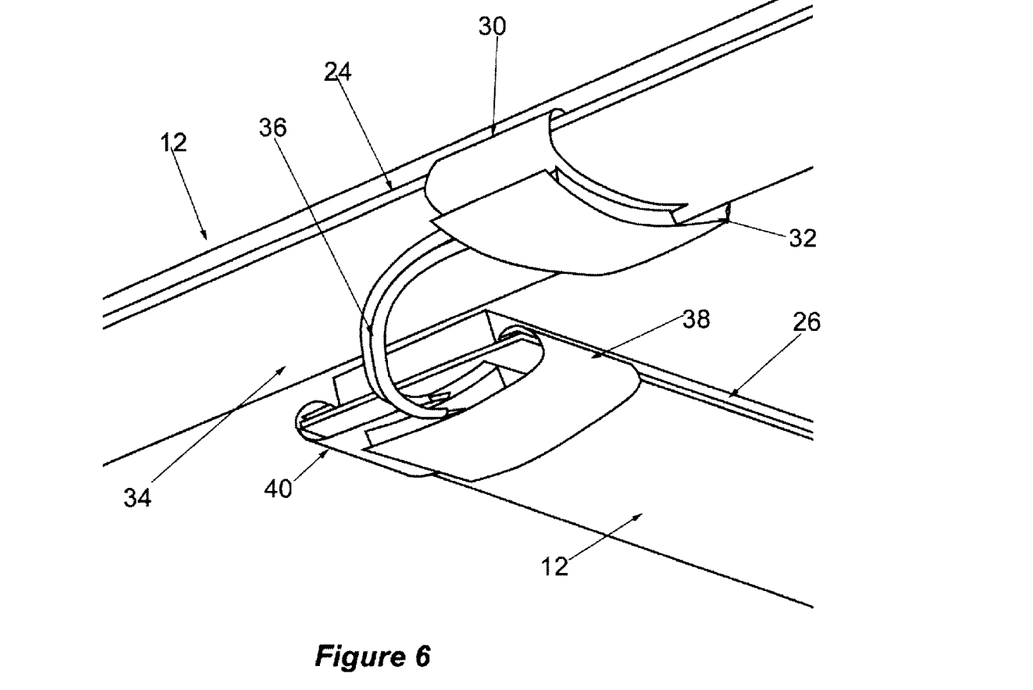
FIG. 6 shows a perspective view of a connection clip of the embodiment of FIG. 1.
Figure 7:
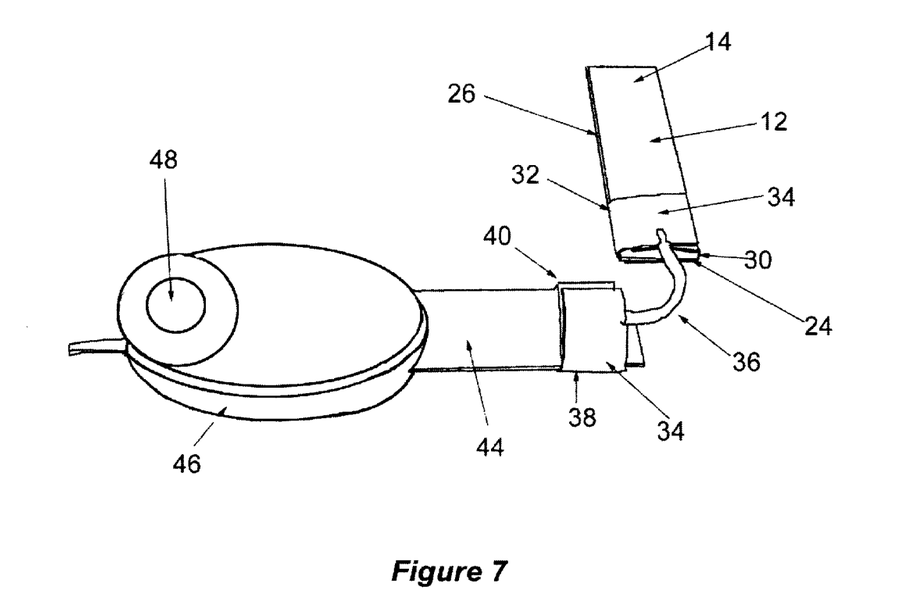
FIG. 7 shows a perspective view of a connection clip and transformer of the embodiment of FIG. 1.

The preferred embodiment of the present invention also includes a connection clip 34, as shown in FIGS. 6 and 7. The connection clip 34 includes a flexible insulated conductor 36 that allows tracks 12 to be connected together or to transformer 46. The flexible conductor 36 enables the connection clip 34 to be curved or angled to allow tracks 12 to be an angle to one another, to be connected to multiple tracks in a "T" formation, to rise over ridges, or to be connected in a straight connection.

Connection clip 34 includes electrical contact leads 30, 32 attached to the electrical contact rails 24, 26 on backing track 12. In a preferred embodiment, these contact leads 30, 32 are formed into spring clips for ease of attachment to the tracks. However, other securing devices may be used as well. Flexible conductor 36 extends from the contact leads 30, 32 to contact leads 38, 40 for attachment to the contract rails 24, 26 of another section of track 12 or to contact leads on the power strip 44 on transformer 46.

It is to be expressly understood that other mechanisms for engaging the contact leads 30, 32 with contact rails 24, 26 are also contemplated, such as by direct attachment through soldering; by clips, by piercing and other mechanisms. The connection mechanism may also include a pivot point to allow the tracks to be angled or bent.

Figure 8:
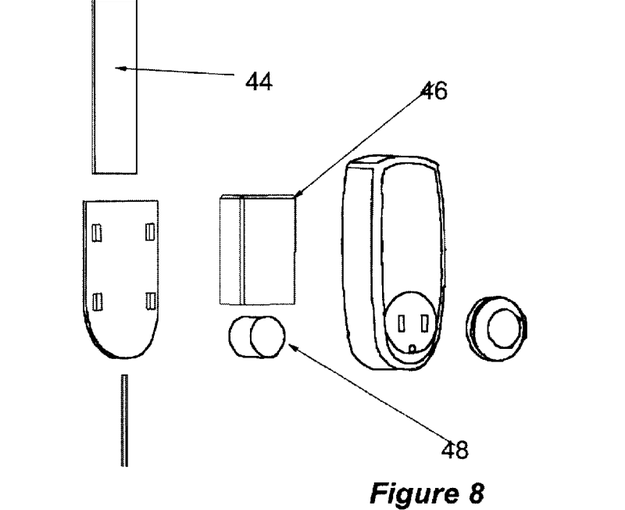
FIG. 8 shows an exploded view of the transformer of FIG. 8.

In the preferred embodiment, electrical transformer 46 is plugged into an AC electrical outlet or wired directly into the household AC current. The AC current is transformed by electrical transformer 46 into low voltage DC current (12 or 24 volt for instance). This DC current is then applied to the contact rails 24, 26, in opposing polarity. A preferred embodiment of transformer 46 is shown in FIG. 8. Transformer 46 also includes a dimmer switch 48 to adjust the brightness of the light fixtures as well as turn the fixtures on and off. In this embodiment, transformer 46 includes an adhesive backing to allow it to be attached to a convenient location on a wall.

In the preferred embodiment, the lighting system also includes fixtures 50. Fixtures 50, in the preferred embodiment shown in FIGS. 9–15, include low-voltage bulb holder 52, having a low voltage bulb 54, such as a halogen bulb, installed therein. The base 56 of fixture 50 also includes spring clip members 58, 60 formed of an electrically conductive material. These members 58, 60 may have an insulation cover as well. The spring clip members have contact surfaces 62, 64 for engagement with contact rails 24, 26 on track 12. The fixture may include a flexible body portion, either mounted on swivel joints, an elastomer body or flexible body, to allow the light fixture to be oriented in a desired direction.

Figure 9:
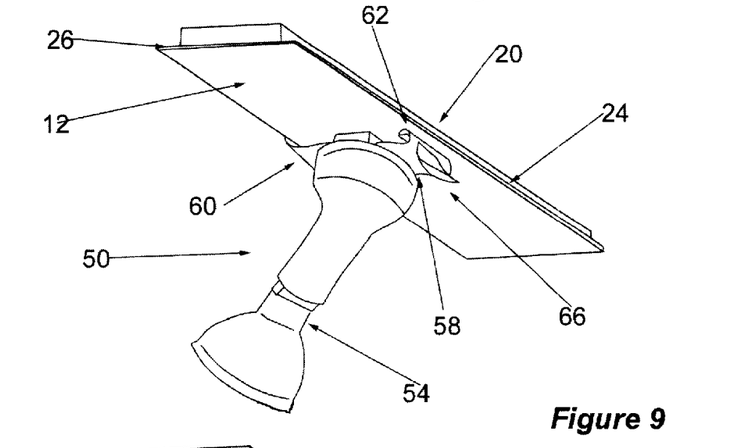
FIG. 9 shows a perspective view of a light fixture of the embodiment of FIG. 1.
Figure 10:
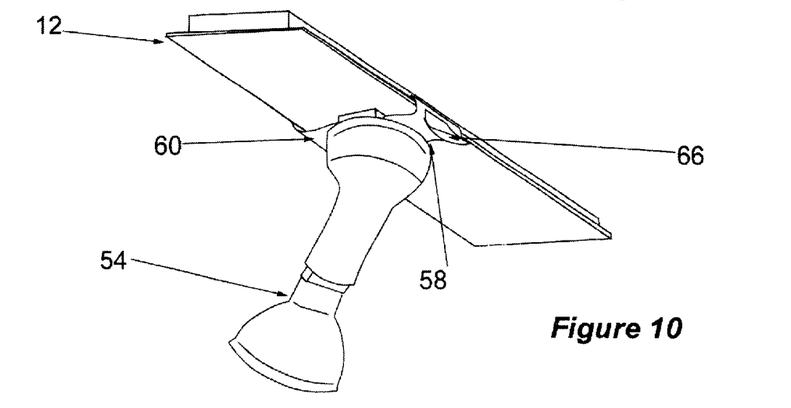
FIG. 10 shows the light fixture assembled onto the backing track of the embodiment of FIG. 1.

In the preferred embodiment illustrated in FIGS. 9–10, the spring clip members are formed of spring sheet metal contact material. A thumb tab 66 or pull ring is affixed on spring clip member 58. A molded elastomer material 68 separates the two spring clip members 58, 60 to insulate the clip members. Plastic rivet 70 or other attachment mechanism attaches the spring clip members and the elastomer 68. Contacts 72, 74 attach to the bulb holder 52.

Figure 11:
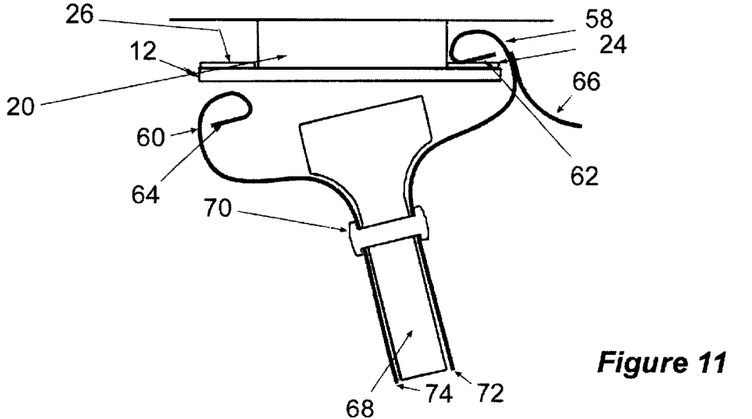
FIG. 11 shows the light fixture being assembled onto the backing track.
Figure 12:
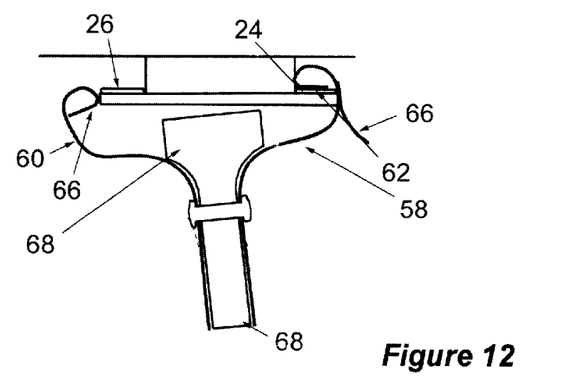
FIG. 12 shows the light fixture partially mounted on the backing track.
Figure 13:
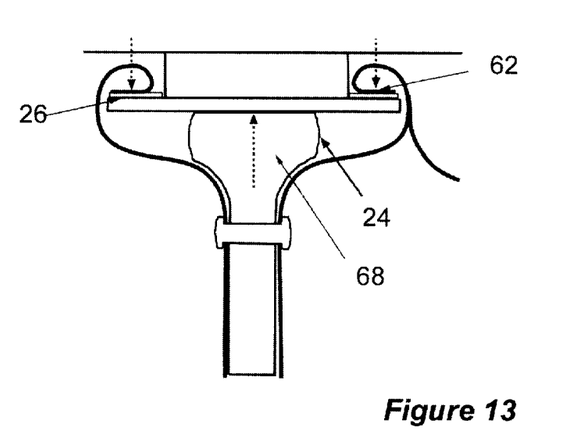
FIG. 13 shows the light fixture securely mounted on the backing track.

In use, fixture 50, as shown in FIGS. 11–13, is grasped between thumb and finger. Spring clip member 58 is engaged over contact rail 24 as the fixture 50 is pivoted until spring clip member 60 engages over contact rail 26. The pressure from the spring clip members 58, 60 forces the elastomer 68 against the lower surface of the backing track. The resilient bias from the elastomer 68 against this surface ensures constant contact between the contact rails 24, 26 and the spring clips 58, 60.

The fixture 50 is easily removed from the backing track by engaging the thumb tab 66 to pull the spring clip member 58 away from the contact rail 24. This releases the fixture from the backing track.

Figure 14:
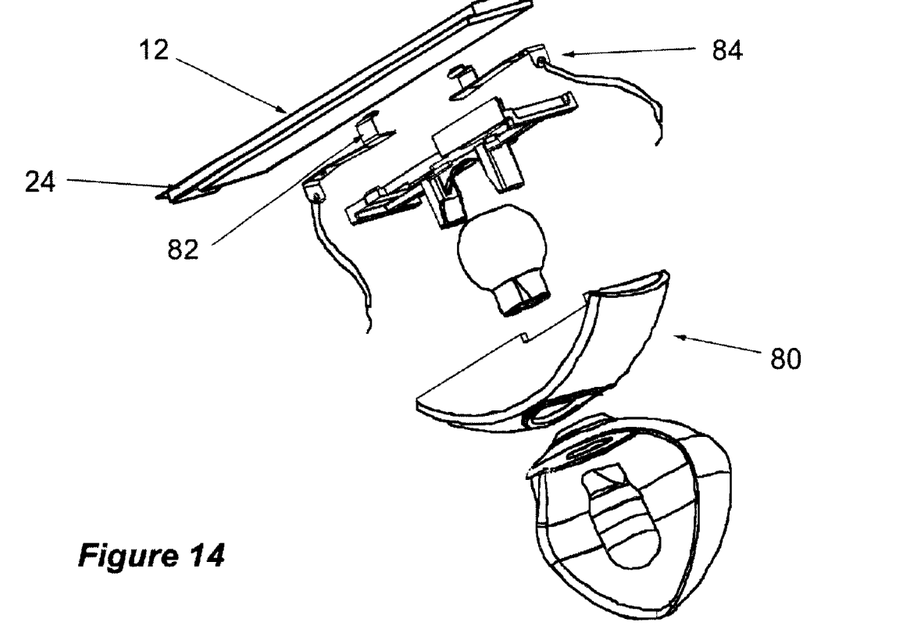
FIG. 14 shows an alternative embodiment of the light fixture of the present invention.
Figure 15:
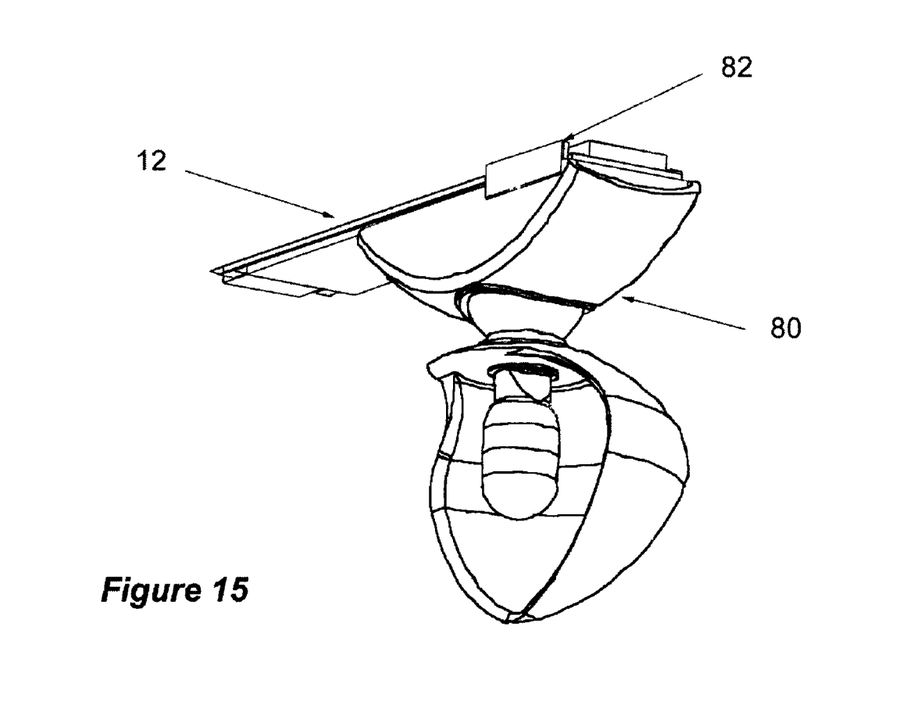
FIG. 15 shows the embodiment of the fixture of FIG. 14 on the track of the electrical light system of the present invention.

Another preferred embodiment of the fixture is shown in FIGS. 14 and 15. This fixture 80 is similar to fixture 50, except that spring clip members 82, 84 are at the sides of fixture 80. The fixture 80 is easily installed by placing the fixture 80 at angle to the track 12 and pivoting the fixture 80 relative to the track until the spring clip members 82, 84 engage on the contact rails 24, 26.

In another preferred embodiment, the track and fixtures include magnetically opposing materials to align and/or engage the fixture to the track. It is to be expressly understood that other mechanisms for engaging the contact leads of the fixutes with contact rails of the track are also contemplated, such as by direct attachment through soldering; by clips, by piercing and other mechanisms.

Installation

In the preferred embodiment, the lighting strip 10 is supplied in rolls. The appropriate length of the strip 10 is unrolled and cut to length with shears, scissors, knives or other commonly used utensils. The person installing the light strip simply removes the protective layer 22 from the adhesive strip 20, and the upper side of the backing track 12 is firmly pressed in the desired location.

The use of the adhesive strip 20 provides full support along the entire length of the strips 12. This ensures that there will not be stress points along the strip 10, and there is no need to attempt to locate studs, rafters or other support members in the surface for attachment. Also, there is no need to drill and/or install anchors in the surface. The flexible property of the strips allow them to be installed over complex surfaces, around corners, even wrapped around vertical and horizontal beams and other surfaces. These systems can not only be used in household areas, but in commercial areas, trade shows and with the appropriate precautions, outdoors. These systems can be permanently installed or used as temporary lighting as well. There is no need for professional installation as these systems can be installed with little mechanical aptitude or even any tools.

The preferred embodiment of the lighting strip of the present invention uses the adhesive strip as described. It is to be expressly understood that other mechanisms for attachment can be used as well, such as mechanical fasteners in high stress areas.

The bottom side 14 of the backing track 12 can either be painted to match the surface on which it is applied, or to provide accent to that surface. In a preferred embodiment, covers are supplied to prevent the contact rails 24, 26 from being painted. These covers can be quickly removed after the strip surfaces are painted to minimize fouling of the contact surfaces by paint. Also, decorative tape can be provided to mount onto the bottom side in the appropriate color or pattern as well.

The connection clip can then be mounted on the backing track 12 as shown in FIG. 6. Multiple connection clips 34 may be used in order to connect different tracks to one another if desired. For example, it may be desired to install different strips at angles to one another, or to connect long runs of the strips together. Connection clips include contact members that engage the contact rails 24, 26 of the different strips 12 to one another in the appropriate polarity.

Light fixtures 50 can be quickly installed by hand at any desired location along the backing track 12. The fixtures 50, as shown in FIGS. 11–13 are mounted by grasping the spring clip members, engaging a first spring clip member onto a contact surface and pivoting the fixture until both spring clip members engage the contact surfaces. Current then can flow from the contact surfaces of the backing track through the clip members to the light bulb 54.

It is to be expressly understood that other engagement mechanisms can be used as well as well as different combinations of the spring contact clip members, spring clips and magnetic members.

What is claimed is:

1. An electrical track lighting system wherein said system comprises:

a non-conductive backing track;

an adhesive mounting mechanism for mounting said backing track to a surface;

a first contact surface affixed to said backing track;

a second contact surface affixed to said backing track;

an electrical supply for supplying electrical power to said first contact surface and said second contact surface;

a light fixture;

a first contact surface formed on a first spring clip member on said light fixture;

a second contact surface formed on a second spring clip member on said light fixture; and an elastomer member for resilient engagement against said backing track so that said first contact surface on said backing track engages said first contact surface on said light fixture and said second contact surface on said backing track engages said second contact of said light fixture.

2. A mw profile electrical track lighting system wherein said system comprises:

a non-conductive backing track having an upper surface and a lower surface;

an adhesive mounting strip on said upper surface for mounting said backing track to a surface;

a first contact surface on said upper surface of said backing track and shielded from said lower surface;

a second contact surface on said upper surface of said backing track and shielded from said lower surface;

an electrical supply for supplying electrical power to said first contact surface and said second contact surface;

a light fixture:

a first contact surface affixed to said light fixture;

a second contact surface affixed to said light fixture; and an attachment mechanism for attaching said light fixture to said backing track so that said first contact surface on said backing track engages said first contact surface on said light fixture and said second contact surface on said backing track engages said second contact of said light fixture.

3. The electrical track lighting system of claim 1 wherein said backing track includes:

an insulation portion for insulating between said first contact surface of said backing track and said second contact surface of said backing track and between said first and second contract surfaces and said adhesive mounting strip.

4. The electrical track lighting system of claim 1 wherein said attachment mechanism includes:

said first contact surface on said light fixture formed on a first spring clip member; and said second contact surface on said light fixture formed on a second spring clip member.

5. The electrical track lighting system of claim 1 wherein said attachment mechanism includes:

said first contact surface on said light fixture formed on a first spring clip member;

said second contact surface on said light fixture formed on a second spring clip member; and an elastomer in ember for resilient engagement against said backing track.

6. The electrical track lighting system of claim 1 wherein said adhesive strip includes:

a double-sided adhesive strip.

7. The electrical track lighting system of claim 1 wherein said electrical supply includes:

a low-voltage power supply.

8. The electrical track lighting system of claim 1 wherein said electrical supply includes:

a DC power supply.

9. The electrical track lighting system of claim 1 wherein said backing track includes:

magnetic strips of opposing polarity for providing alignment for said fixtures.

10. The electrical track lighting system of claim 1 wherein said mounting mechanism includes:

magnetic strips for securing said fixtures to said backing track.

11. The electrical track lighting system of claim 1 wherein said backing track includes:

a paintable visible outer surface to complement the surrounding environment.

12. The electrical lighting system of claim 1 wherein said backing track includes:

being formed of a flexible material to enable said backing track to be flexible.

13. An electrical track lighting system wherein said system comprises:

a non-conductive backing track having an upper surface and a lower surface;

a mechanism, on said upper surface for mounting said backing track to a surface;

said a first contact surface on said upper surface of said backing track and shielded from lower surface;

a second contact surface on said upper surface of said backing track and shielded from said lower surface;

said lower surface having a paintable surface to blend in with the surrounding environment;

an electrical supply for supplying electrical power to said first contact surface and said second contact surface;

a light fixture;

a first contact surface affixed to said light fixture;

a second contact surface affixed to said light fixture; and an attachment mechanism for attaching said light fixture to said backing track so that said first contact surface on said backing track engages said first contact surface on said light fixture and said second contact surface on said backing track engages said second contact of said light fixture.

* * * * *